United States Patent
Cho et al.

(10) Patent No.: US 11,435,469 B2
(45) Date of Patent: Sep. 6, 2022

(54) MOVING OBJECT DETECTION SYSTEM AND METHOD

(71) Applicant: WRT LAB CO., LTD., Seoul (KR)

(72) Inventors: Sung Ho Cho, Seoul (KR); Jeong Woo Choi, Seoul (KR)

(73) Assignee: WRT LAB CO., LTD., Seoul (KR)

( * ) Notice: Subject to any disclaimer, the term of this patent is extended or adjusted under 35 U.S.C. 154(b) by 378 days.

(21) Appl. No.: 16/469,902

(22) PCT Filed: Dec. 14, 2017

(86) PCT No.: PCT/KR2017/014756
§ 371 (c)(1),
(2) Date: Jun. 14, 2019

(87) PCT Pub. No.: WO2018/111011
PCT Pub. Date: Jun. 21, 2018

(65) Prior Publication Data
US 2020/0081116 A1    Mar. 12, 2020

(30) Foreign Application Priority Data
Dec. 16, 2016    (KR) .......................... 10-2016-0171230

(51) Int. Cl.
*G01S 13/02*    (2006.01)
*G01S 13/87*    (2006.01)
*G01S 13/70*    (2006.01)

(52) U.S. Cl.
CPC ........ *G01S 13/872* (2013.01); *G01S 13/0209* (2013.01); *G01S 13/70* (2013.01)

(58) Field of Classification Search
CPC ...... G01S 13/0209; G01S 13/70; G01S 13/87; G01S 13/872; G01S 13/02; G01S 17/46; G01S 17/87; G01S 2013/466
See application file for complete search history.

(56) References Cited

U.S. PATENT DOCUMENTS 9,753,121 B1 *    9/2017    Davis ...................... G01S 13/18

FOREIGN PATENT DOCUMENTS

JP    H10-283461 A    10/1998
JP    2009-25853 A    2/2009
(Continued)

OTHER PUBLICATIONS

Choi, Jeong Woo et al., "A Pairing Algorithm of Range Information between Mulltiple IR-UWB Radar Sensors," In: Consumer Communications & Networking Conference (CCNC), 2016, 13th IEEE Annual, pp. 1-5, ISSN 2331-9860, pp. 1-4.
(Continued)

*Primary Examiner* — Timothy A Brainard
(74) *Attorney, Agent, or Firm* — Locke Lord LLP; Scott D. Wofsy; Michael J. Pollack

(57) ABSTRACT

Disclosed is a moving object detection system and method. The moving object detection system includes an input unit receiving the sensed signals from two or more radar devices, a distance information computation unit computing distance information of the objects from the received signals, a grouping unit randomly selecting one signal to generate multiple signal groups, and generating the signal groups selected among the generated multiple signal groups as one signal group combination, a calculation unit calculating cross-correlation values for all the signal groups in the same signal group combination and adding up the calculated cross-correlation values, a combination selection unit selecting the signal group combination in which a sum of the cross-correlation values is a maximum, and a position computation unit computing a position of each object by matching the signal groups in the selected signal group combination to the objects.

6 Claims, 5 Drawing Sheets

(56) References Cited

FOREIGN PATENT DOCUMENTS

| | | |
|---|---|---|
| JP | 2009-139228 A | 6/2009 |
| KR | 10-2010-0089385 A | 8/2010 |
| KR | 10-2012-0042138 A | 5/2012 |
| KR | 10-2014-0073657 A | 6/2014 |
| KR | 10-2014-0123270 A | 10/2014 |
| KR | 10-1591164 B1 | 2/2016 |

OTHER PUBLICATIONS

International Search Report issued in PCT/KR2017/014756, dated Apr. 13, 2018.

* cited by examiner

[FIG. 1]
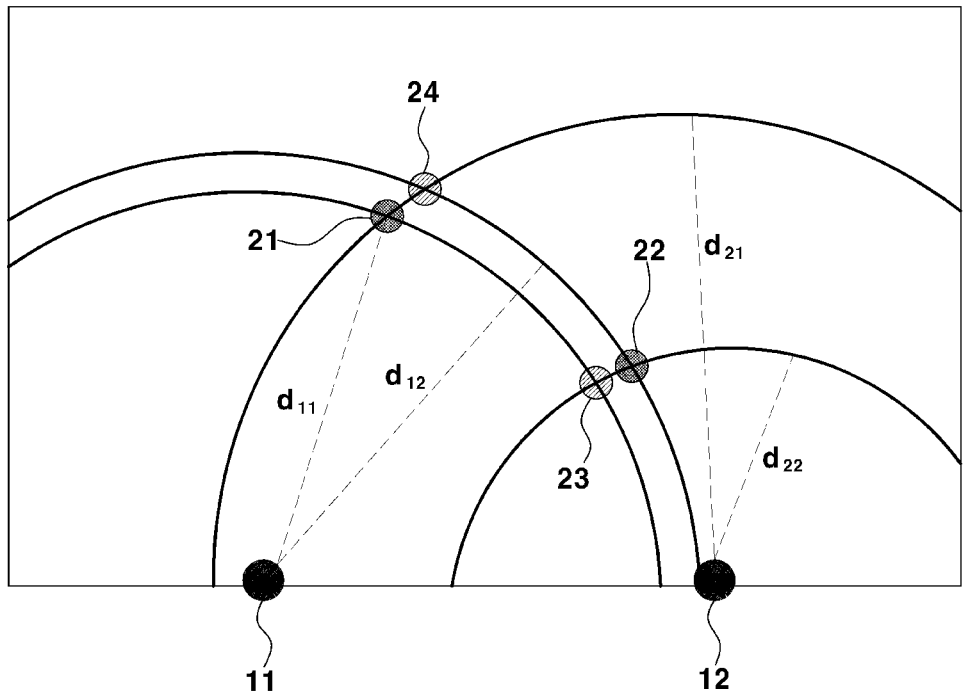
[FIG. 2]
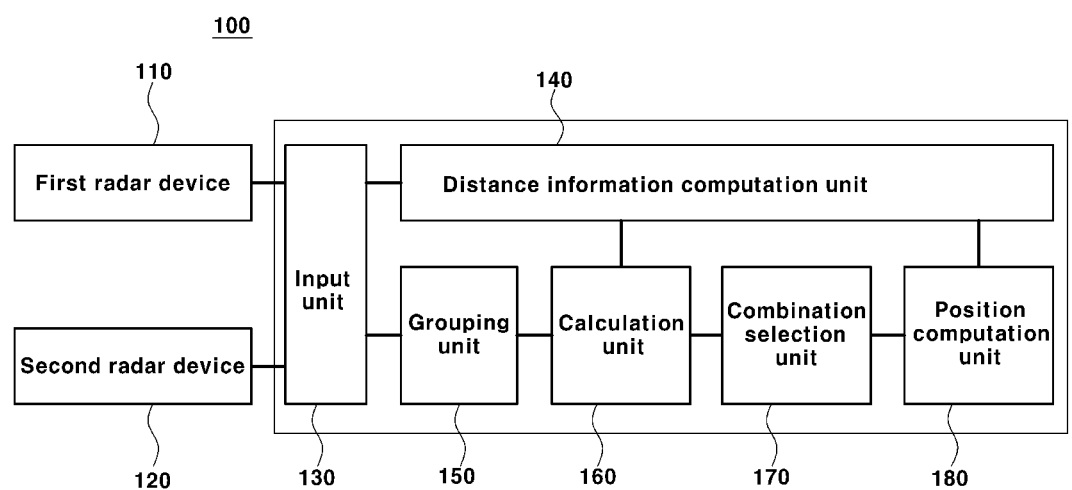

[FIG. 3]
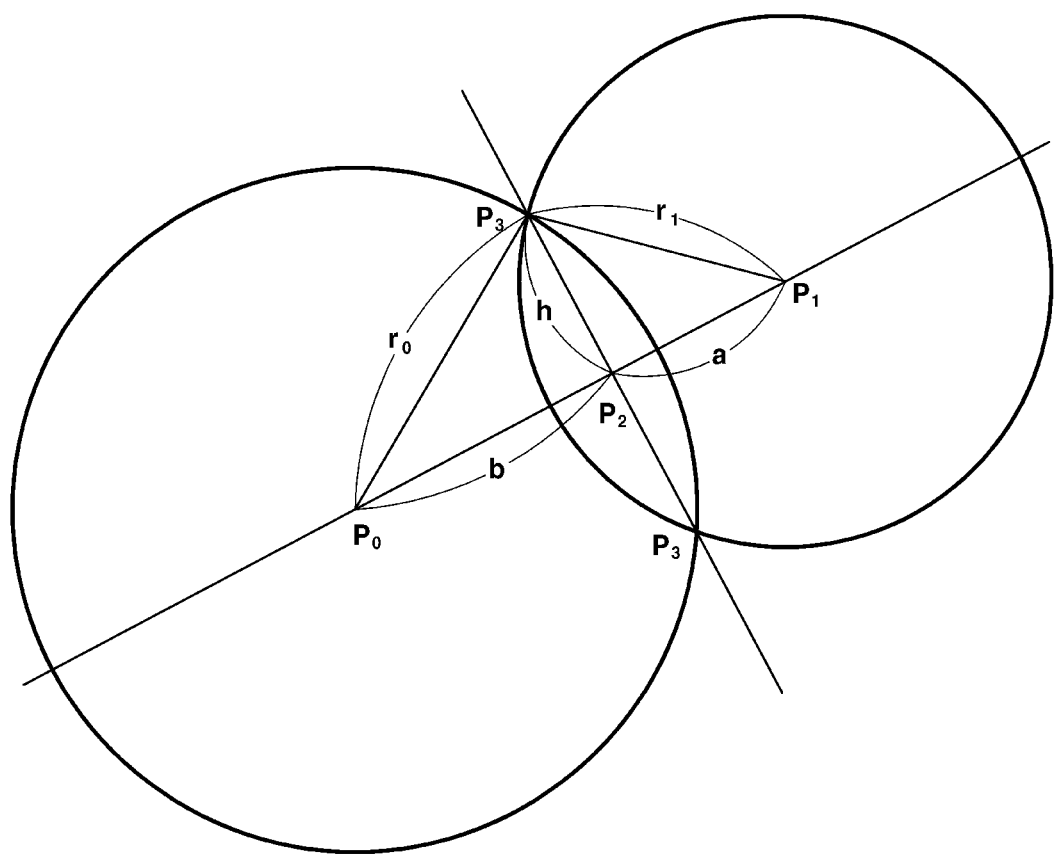

[FIG. 4]
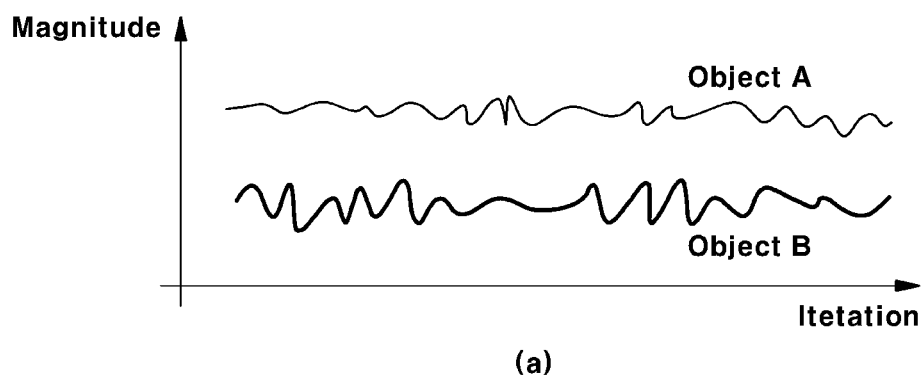
(a)
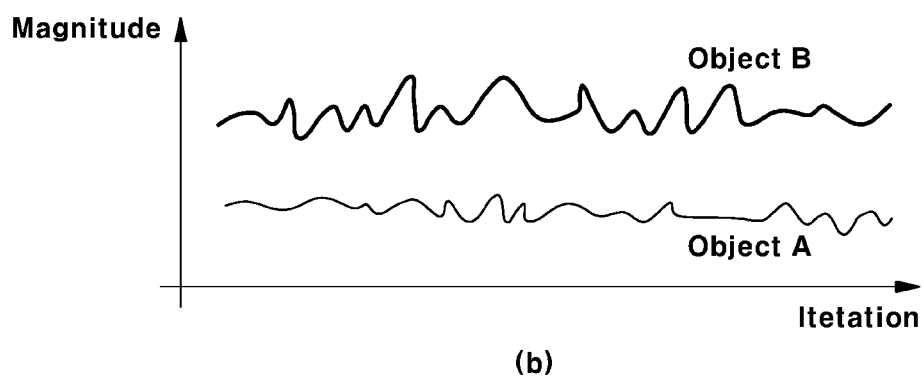
(b)

[FIG. 5]
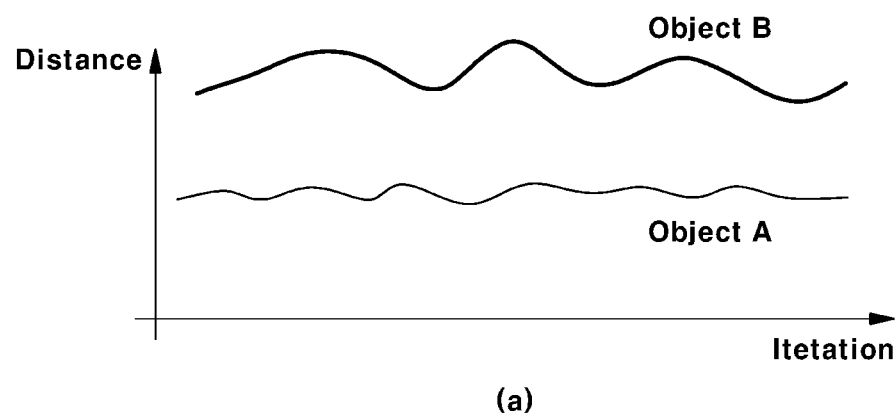
(a)
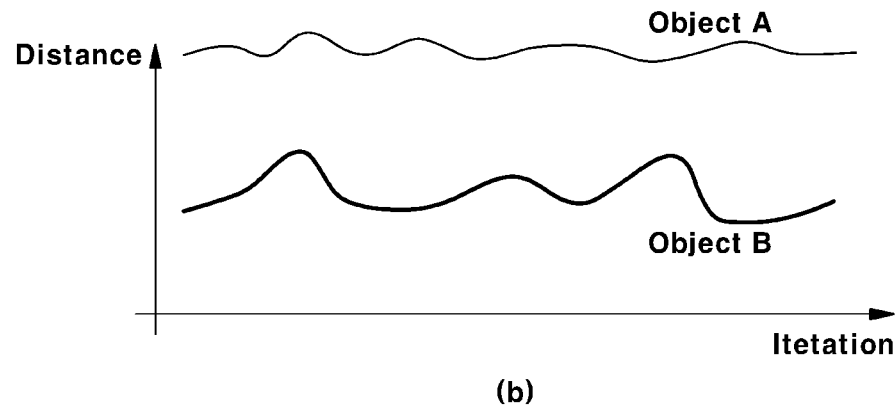
(b)

[FIG. 6]
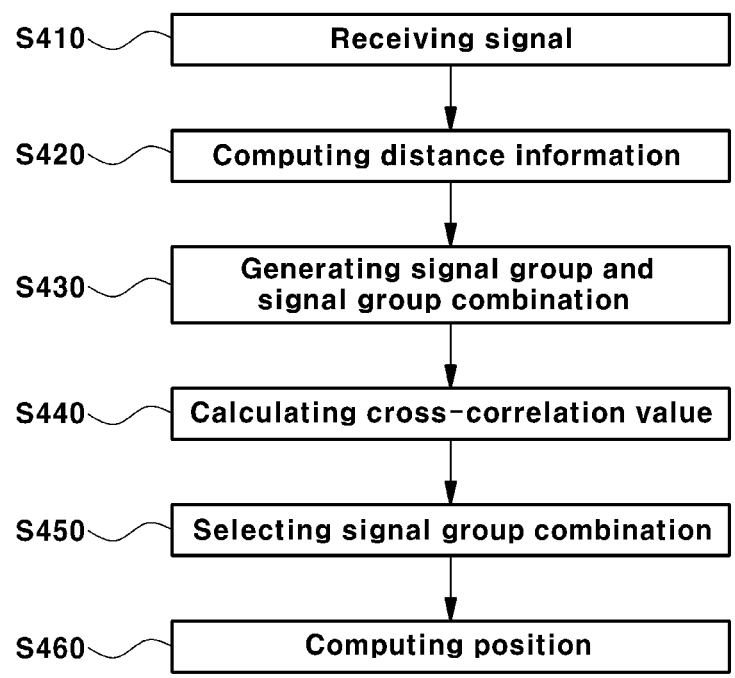

MOVING OBJECT DETECTION SYSTEM AND METHOD

CROSS REFERENCE TO RELATED APPLICATIONS

This application is a U.S. National Phase Application filed under 35 U.S.C. § 371, based on Application PCT/KR2017/014756, filed Dec. 14, 2017, which application claims priority to Korean Patent Application No. 10-2016-0171230 filed on Dec. 15, 2016. The entire contents of these applications are incorporated herein by reference in their entirety.

TECHNICAL FIELD

The present invention relates to a moving object detection system and method.

BACKGROUND ART

A moving object detection system may be applied in places such as the interior of a building where security is required, and a department store and a museum where customer's movements need to be known. As a method of assigning an ID to each object and of identifying the ID assigned to the object, the moving object detection system has mainly used a method of detecting a position of an object. This method is unable to guarantee personal privacy, and is unable to identify the position of the object unless a device for identifying the ID is used.

However, when positions of multiple objects are detected using only radar without assignment of IDs, if using only distance information that may be estimated from a signal which reflects off an object, it is impossible to be aware to which object the signal sensed by each radar belongs, so it is difficult to detect the exact position of each object.

FIG. 1 is a diagram illustrating a problem occurring when a moving object is sensed using radar.

Referring to FIG. 1, a moving object detection system computes positions of a first object 21 and a second object 22 using a first radar 11 and a second radar 12. When it is possible to identify to which target the signal sensed by each radar belongs, it is possible to detect the position of the first object 21 using distance information $d_{11}$ of the first object 21 sensed by the first radar 11 and distance information $d_{21}$ of the first object 21 sensed by the second radar 12; and it is possible to detect the position of the second object 22 using distance information $d_{12}$ of the second object 22 sensed by the first radar 11 and distance information $d_{22}$ of the second object 22 sensed by the second radar 12. However, in a moving object detection system using the conventional radar, there is no method to distinguish to which object the signal sensed by each radar belongs. Therefore, when the distance information $d_{11}$ of the first object 21 sensed by the first radar 11 is combined with the distance information $d_{22}$ of the second object 22 sensed by the second radar 12, an erroneous position 23 different from the actual position of the first object 21 is detected. Regarding the second object 22, when the distance information $d_{12}$ of the second object 22 sensed by the first radar 11 is combined with the distance information $d_{21}$ of the second object 22 sensed by the second radar 12, an erroneous position 24 different from the actual position of the second object 22 is detected.

DISCLOSURE

Technical Problem

Accordingly, the present disclosure has been made keeping in mind the above problems occurring in the related art, and the present disclosure is intended to propose a moving object detection system and method capable of accurately detecting positions of multiple moving objects by using radar.

Technical Solution

In order to achieve the above object, according to an exemplary embodiment of the present invention, there is provided a moving object detection system including: two or more radar devices sensing signals of multiple objects; an input unit receiving the sensed signals from the two or more radar devices; a distance information computation unit computing distance information of the objects from the received signals; a grouping unit randomly selecting one signal for each radar device among the received signals to generate multiple signal groups, and generating the signal groups selected among the generated multiple signal groups as one signal group combination, thereby generating multiple signal group combinations as the number of all possible cases; a calculation unit calculating cross-correlation values for all the signal groups in the same signal group combination and adding up the calculated cross-correlation values; a combination selection unit selecting the signal group combination in which a sum of the cross-correlation values is a maximum; and a position computation unit computing a position of each object by matching the signal groups in the selected signal group combination to the objects, wherein the grouping unit generates the multiple signal groups and the multiple signal group combinations in such a manner that all the signals belong to any one of the multiple signal groups belonging to the one signal group combination.

The calculation unit may calculate the cross-correlation value collecting magnitude and the distance information of the signals belonging to the one signal group, for each frame within a predetermined time.

The distance information computation unit may compute the distance information using a time taken for the signal radiated from the radar device to reflect off each object and to be sensed by the radar device.

The radar device may have directivity.

The radar device may be an IR-UWB radar.

The position computation unit may compute the position of each object using the distance information of the signals in the signal group matched to the objects.

Also, according to another exemplary embodiment of the present invention, there is provided a moving object detection method including: (a) receiving signals of multiple objects by using two or more radar devices; (b) computing distance information of the objects from the received signals; (c) randomly selecting one signal for each radar device among the received signal to generate multiple signal groups, and generating the signal groups selected among the generated multiple signal groups as one signal group combination, thereby generating multiple signal group combinations as the number of all possible cases; (d) calculating cross-correlation values for all the signal groups in the same signal group combination and adding up the calculated cross-correlation values; (e) selecting the signal group combination in which a sum of the cross-correlation values is a maximum; and (f) computing a position of each object by matching the signal groups in the selected signal group combination to the objects, wherein at the step (c), the multiple signal groups and the multiple signal group combinations are generated in such a manner that all the signals belong to any one of the multiple signal groups belonging to the one signal group combination.

At the step (d), the cross-correlation value may be calculated collecting magnitude and the distance information of the signals belonging to the one signal group, for each frame within a predetermined time.

At the step (b), the distance information may be computed using a time taken for the signals radiated from the two or more radar devices to reflect off each object and to be sensed by the two or more radar devices.

The radar device may have directivity.

The radar device may be an IR-UWB radar.

At the step (d), the position of each object may be computed using the distance information of the signals in the signal group matched to the objects.

Advantageous Effects

The present invention can accurately detect positions of multiple moving objects by using radar without violating privacy.

DESCRIPTION OF DRAWINGS

FIG. 1 is a diagram illustrating a problem occurring when a moving object is sensed using radar.

FIG. 2 is a diagram illustrating a configuration of a moving object detection system 100 according to an exemplary embodiment of the present invention.

FIG. 3 is a diagram illustrating calculation of a position computation unit 180 of a moving object detection system 100 according to an exemplary embodiment of the present invention.

FIG. 4 is a graph illustrating magnitude of signals over time of two objects which are sensed by a radar device.

FIG. 5 is a graph illustrating distance information of signals over time of two objects which are sensed by a radar device.

FIG. 6 is a flowchart illustrating a moving object detection method over time according to an embodiment of the present invention.

MODE FOR INVENTION

The present invention may be modified in various ways and implemented by various embodiments, so that specific embodiments are shown in the drawings and will be described in detail. However, the present invention is not limited thereto, and the exemplary embodiments can be construed as including all modifications, equivalents, or substitutes in a technical concept and a technical scope of the present invention. The similar reference numerals refer to the similar elements described in the drawings.

Terms "first", "second", etc. used in the specification can be used to describe various elements, but the elements are not to be construed as being limited to the terms. The terms are only used to differentiate one element from other elements. For example, the "first" element may be named the "second" element without departing from the scope of the present invention, and the "second" element may also be similarly named the "first" element. Hereinafter, embodiments of the present invention will be described in detail with reference to the accompanying drawings.

FIG. 2 is a diagram illustrating a configuration of a moving object detection system 100 according to an exemplary embodiment of the present invention.

Referring to FIG. 2, the moving object detection system 100 according to the exemplary embodiment of the present invention includes a first radar device 110, a second radar device 120, an input unit 130, a distance information computation unit 140, a grouping unit 150, a calculation unit 160, a combination selection unit 170, and a position computation unit 180.

The first radar device 110 and the second radar device 120 sense a signal of an object. The object may be a moving object or a stationary object. Also, the first radar device 110 and the second radar device 120 may be an IR-UWB radar. The IR-UWB radar has excellent resolution and is easy to find minute changes of an object. Further, the first radar device 110 and the second radar device 120 may have directivity in such a manner as to detect the position of the object in a particular direction.

The input unit 130 receives a sensed signal from the first radar device 110 and the second radar device 120. The input unit 130 recognizes which one of the first radar device 110 and the second radar device 120 has sensed the received signal.

The distance information computation unit 140 computes distance information from the sensed signals by the first radar device 110 and the second radar device 120. The first radar device 110 and the second radar device 120 sense a signal of each object. Considering the time that it takes signals radiated from the first radar device 110 and the second radar device 120 to reach each object and to reflect off each object and to be sensed by the first radar device 110 and the second radar device 120 again, the distance information computation unit computes the distance information, which is the distance between each object and the first radar device 110 and the second radar device 120. The distance information of the signal is used to compute the position of each object and is also used to calculate a cross-correlation value which will be described later.

The grouping unit 150 randomly selects one signal for each radar device among the input signals to generate multiple signal groups, and generate the selected signal group among the generated multiple signal groups as one signal group combination. In particular, the grouping unit 150 generates multiple signal groups and multiple signal group combinations in such a manner that all the signals belong to any one of multiple signal groups belonging to one signal group combination. For example, when two moving objects are detected using two radar devices, two signal group combinations are generated and two signal groups are generated for each signal group combination. In this way, the grouping unit 150 generates as many signal groups and signal group combinations as the number of all possible cases.

The calculation unit 160 calculates cross-correlation values for all signal groups of the same signal group combination and adds up the calculated cross-correlation values in order to determine whether signal groups of one among the generated signal group combinations are the same as actual signal groups generated from signals for each moving object. The detailed calculation process of the calculation unit 160 will be described later.

The combination selection unit 170 selects a signal group combination in which the sum of the calculated cross-correlation values by the calculation unit 160 is the maximum in order to select a signal group combination consisting only of signal groups including signals of the same object.

Through the following calculation, the position computation unit 180 accurately computes the positions of all the objects by matching the signal groups of the signal group combination to the objects and by using distance information of the signals of the signal group matched to the object.

FIG. 3 is a diagram illustrating calculation of a position computation unit 180 of a moving object detection system 100 according to an exemplary embodiment of the present invention.

Referring to FIG. 3, the first radar device 110 is positioned at $P_0=(x_0, y_0)$, the second radar device 120 is positioned at $P_1=(x_1, y_1)$, and the object is positioned at $P_3=(x_3, y_3)$. The signal sensed by the first radar device 110 contains distance information r0 of the object, and the signal sensed by the second radar device 120 contains distance information r1 of the object.

In FIG. 3, the following Equations are established by defining right triangles $P_0P_2P_3$ and $P_1P_2P_3$.

$$a^2+h^2=r_0^2$$

$$b^2+h^2=r_1^2 \quad \text{[Equation 1]}$$

Further, the distance between the first radar device 110 and the second radar device 120 is d=a+b, so the following Equation is obtained by solving Equation 1 for a.

$$a = \frac{(r_0^2 - r_1^2 + d^2)}{(2d)} \quad \text{[Equation 2]}$$

Therefore, the following Equation is established.

$$P_2 = P_0 + \frac{a(P_1 - P_0)}{d} \quad \text{[Equation 3]}$$

Here, the coordinates of position $P_3=(x_3, y_3)$ of the object are obtained as the following Equation.

$$x_3 = x_2 \pm \frac{h(y_1 - y_0)}{d}$$

$$y_3 = y_2 \mp \frac{h(x_1 - x_0)}{d} \quad \text{[Equation 4]}$$

When the first radar device 110 and the second radar device 120 are omnidirectional, two positions of $P_3$ are obtained as shown in Equation 4 referring to FIG. 3. However, when using a radar device having directivity or an additional radar, one position of $P_3$ is computed.

Here, the calculation process of the grouping unit 150 and the calculation unit 160 will be described in detail. The grouping unit 150 randomly selects one signal for each radar device among both the signals received from the first radar device 110 and the signals received from the second radar device 120 to generate the multiple signal groups, and generates the selected signal group among the generated multiple signal groups as one signal group combination, whereby multiple signal group combinations are generated. In particular, as described above, multiple signal groups and signal group combinations are generated in such a manner that all signals belong to any one of multiple signal groups belonging to one signal group combination, and as many signal group combinations are generated as the number of all possible cases.

The calculation unit 160 calculates a cross-correlation value of signals belonging to one signal group and calculates the sum of cross-correlation values of all the signal groups in one signal group combination. This calculation of the cross-correlation value is performed with respect to the magnitude of the signal and also to the distance information of the signal computed by the distance information computation unit 140. In particular, a cross-correlation value in a particular frame of a signal is calculated by collecting frames within a predetermined time. When pieces of distance information of the signal are collected according to each time frame to calculate the cross-correlation value, it is easy to find the same object in the case where the object is moving.

FIG. 4(*a*) is a graph illustrating magnitude of signals of two objects sensed by the first radar device 110 over time. FIG. 4(*b*) is a graph illustrating magnitude of signals of two objects sensed by the second radar device 120 over time.

Referring to FIG. 4, it is found that although magnitude information of the same object represents different values in the graph for each radar, the shape changing with time has a unique shape for each object. Therefore, when calculating the cross-correlation value by collecting magnitude of signals from each radar device on the basis of the time frame, the cross-correlation value calculated for the signals of the same object is the highest.

FIG. 5(*a*) is a graph illustrating distance information of signals of two objects sensed by the first radar device 110 over time. FIG. 5(*b*) is a graph illustrating distance information of signals of two objects sensed by the second radar device 120 over time.

Referring to FIG. 5, it is found that although distance information of the same object represents different values in the graph for each radar, the shape changing with time has a unique shape for each object. Therefore, when calculating the cross-correlation value by collecting pieces of distance information of signals from each radar device on the basis of the time frame, the cross-correlation value calculated for the signals of the same object is the highest.

Therefore, the cross-correlation value for the magnitude of the signals of the same object sensed by each radar device is larger than the cross-correlation value for the magnitude of the signals of different objects. Also, the cross-correlation value for the distance information of the signals of the same object sensed by each radar device is larger than the cross-correlation value for the distance information of the signals of different objects.

Accordingly, in order to determine whether the signals in the signal group are for the same object, the calculation unit 160 calculates cross-correlation values between signals in all the signal groups generated by the grouping unit 150 and compares the sums of the values for respective signal group combinations.

The magnitude of the signal received from the first radar device 110 to detect the position of the object and the distance information are shown as in the following Equation.

$$M_{1i}=[m_{1i_{(k-W+1)}}, m_{1i_{(k-W+2)}}, \ldots, m_{1i_k}]$$

$$D_{1i}=[d_{1i_{(k-W+1)}}, d_{1i_{(k-W+2)}}, \ldots, d_{1i_k}] \quad \text{[Equation 5]}$$

In Equation 5, $m_{1ik}$ is the magnitude of frame k of signal i sensed by the first radar device 110; $d_{1ik}$ is the distance information of frame k of signal i sensed by the first radar device 110; and W is the number of frames to be used.

In the meantime, the magnitude of the signal received from the second radar device 120 to detect the position of the object and the distance information are shown as in the following Equation.

$$M_{2i}=[m_{2i_{(k-W+1)}}, m_{2i_{(k-W+2)}}, \ldots, m_{2i_k}]$$

$$D_{2i}[d_{2i_{(k-W+1)}}, d_{2i_{(k-W+2)}}, \ldots, d_{2i_k}] \quad \text{[Equation 6]}$$

In Equation 6, $m_{2ik}$ is the magnitude of frame k of signal i sensed by the second radar device 120; and $d_{2ik}$ is the distance information of frame k of signal i sensed by the second radar device 120.

Therefore, a cross-correlation value of each signal group is shown as in the following Equation.

$$C_{M_{ij}} = \text{corrocef}(M_{1i}, M_{2j})$$

$$C_{D_{ij}} = \text{corrcoef}(D_{1i}, D_{2j}) \quad \text{[Equation 7]}$$

In Equation 7, $C_{M_{ij}}$ is a cross-correlation value for the magnitude of signal i sensed by the first radar device 110 and the magnitude of signal j sensed by the second radar device 120, $C_{D_{ij}}$ is a cross-correlation value for the distance information of signal i sensed by the first radar device 110 and the distance information of signal j sensed by the second radar device 120.

For example, when the first radar device 110 and the second radar device 120 detect positions of a first object and a second object, the first radar device 110 senses a first signal and a second signal although it is unable to determine to which object the first and the second signal belong; and the second radar device 120 also senses a third signal and a fourth signal although it is unable to determine to which object the third and the fourth signal belong.

The grouping unit 150 combines the first signal and the second signal, which are sensed by the first radar device 110, with the third signal and the fourth signal, which are sensed by the second radar device 120, to generate as many signal groups as the number of all possible cases.

When two radar devices are used and signals which reflect off two objects are generated into signal group combinations, the number of all possible combinations is two.

First, when generating a first signal group of the first signal and the third signal, a second signal group of the second signal and the fourth signal is generated, thereby generating a first signal group combination.

Second, when generating a first signal group of the first signal and the fourth signal, a second signal group of the second signal and the third signal is generated, thereby generating a second signal group combination.

The sum of cross-correlation values in each signal group combination is shown as in the following Equation.

$$P_{11} = C_{M_{11}} + C_{M_{22}} + C_{D_{11}} + C_{D_{22}}$$

$$P_{12} = C_{M_{12}} + C_{M_{21}} + C_{D_{12}} + C_{D_{21}} \quad \text{[Equation 8]}$$

In Equation 8, $P_{11}$ is the sum of the cross-correlation values for the first signal group combination, and $P_{12}$ is the sum of the cross-correlation values for the second signal group combination.

The combination selection unit 170 compares the sums of the cross-correlation values of all the signal group combinations calculated by the calculation unit 160, and selects the signal group combination having the largest sum of the cross-correlation values.

Therefore, in the case of $P_{11} > P_{12}$, the combination selection unit 170 selects the first signal group combination. In the case of $P_{11} < P_{12}$, the second signal group combination is selected.

Next, the position computation unit 180 uses the distance information of signals for each signal group of the selected signal group combination to accurately compute the position of each object according to the above-described calculation by the position computation unit 180.

Also, according to another embodiment of the present invention, there is provided a moving object detection system that includes N radar devices and is capable of detecting M objects.

According to the embodiment of the present invention, when the moving object detection system including N radar devices detects M objects, operations of the grouping unit 150, the calculation unit 160, and the combination selection unit 170 are as follows.

The magnitude information and the distance information of the sensed signal are shown as in the following Equation.

$$T_{ij_k} = \begin{bmatrix} d_{ij(n-W+1)}, d_{ij(n-W+2)}, \ldots, d_{ij_n} \\ m_{ij(n-W+1)}, m_{ij(n-W+2)}, \ldots, m_{ij_n} \end{bmatrix} \quad \text{[Equation 9]}$$

In Equation 9, $T_{ij_k}$ is information at the time of frame k of the i-th signal sensed by the i-th radar, $d_{ij_k}$ is the distance information at the time of frame k of the j-th signal sensed by the i-th radar, $m_{ij_k}$ is the magnitude at the time of frame k of the j-th signal sensed by the i-th radar, and W is the number of frames to be used.

In the meantime, the number Q of all signal group combinations for M signals sensed by N radars is shown as in the following Equation.

$$Q = M^{(N-1)} \times (M-1)^{(N-1)} \times (M-2)^{(N-1)} \times \ldots \times 2^{(N-1)} \quad \text{[Equation 10]}$$

Therefore, the grouping unit 150 generates as many signal group combinations as the number Q of all cases.

In the meantime, the calculation unit 160 calculates $P_{1k}, P_{2k}, \ldots, P_{Qk}$ which are the sums of cross-correlation values for respective signal group combinations according to the following process.

The cross-correlation value of each signal group for the 1-th signal group combination is calculated as in the following Equation.

$$\frac{1}{2} \sum_{i=1}^{N} \left[ \sum_{j=1}^{N} \text{corrcoef}(T_{i(vli1)_k}, T_{j(vlj1)_k}) - \text{corrcoef}(T_{i(vli1)_k}, T_{j(vli1)_k}) \right] \quad \text{[Equation 11]}$$

In Equation 11, $v_{li1}$ is the number assigned to the first signal in the i-th radar for the 1-th signal group combination.

Therefore, the sum of cross-correlation values for each signal group combination for the 1-th pairing is shown as in the following Equation.

$$P_{lk} = \sum_{n=1}^{M} \left\{ \frac{1}{2} \sum_{i=1}^{N} \left[ \sum_{j=1}^{N} \text{corrcoef}(T_{i(vlin)_k}, T_{j(vljn)_k}) - \text{corrcoef}(T_{i(vlin)_k}, T_{j(vlin)_k}) \right] \right\} \quad \text{[Equation 12]}$$

When the Q values, computed using Equation 12, are compared and the maximum value arg $\max([P_{1k}, P_{2k}, \ldots, P_{Qk}])$ is obtained, the combination selection unit 170 is able to select the signal group combination wherein the sum of the cross-correlation value is the maximum.

Therefore, the position computation unit 170 matches the signal groups of the selected signal group combination to the objects and uses the distance information of the signals of the signal groups matched to the objects to accurately compute the position of each object.

As described above, the embodiment of the present invention, the moving object detection system is capable of accurately detecting the positions of M moving objects by using N radars.

FIG. 6 is a flowchart illustrating a moving object detection method over time according to an embodiment of the present invention.

Referring to FIG. 6, according to an embodiment of the present invention a moving object detection method includes: (a) receiving a signal at step S410; (b) computing distance information at step S420; (c) generating a signal group and a signal group combination at step S430; (d) calculating a cross-correlation value at step S440; (e) selecting a signal group combination at step S450; (f) computing a position at step S460.

At the step (a) of receiving the signal (S410), a signal of a moving object is received from two or more radar devices. The radar device has directivity, and for example, an IR-UWB radar is used.

At the step (b) of computing the distance information (S420), distance information between each radar device and each of the objects is computed from the received signals. Considering the time that it takes a signal radiated from each radar device to reach each object and to reflect off each other and to be sensed by each radar device again, the distance information which is the distance between each of the objects and each radar device is computed.

At the step (c) of generating the signal group and the signal group combination (S430), one signal for each radar device is selected among the received signals to generate multiple signal groups, and signal groups selected among the generated multiple signal groups are generated as one signal group combination to generate multiple signal group combinations. Multiple signal groups and signal group combinations are generated in such a manner that all input signals belong to any one of the multiple signal groups belonging to one signal group combination. The as many signal group combinations are generated as the number of all possible combination cases.

At the step (d) of calculating the cross-correlation value (S440), the sum of cross-correlation values for all the signal groups in the generated signal group combination at the step (c) is calculated. This calculation of the cross-correlation value is performed with respect to the magnitude of the signal and also to the distance information of the signal computed at the step (b). In particular, a cross-correlation value in a particular frame of a signal is calculated by collecting frames within a predetermined time. When pieces of distance information of the signal are collected according to each time frame to calculate the cross-correlation value, it is easy to find the same object in the case where the object is moving.

The cross-correlation value for distance information of the signals of the same object sensed by each radar device is larger than the cross-correlation value for the distance information of the signals of different objects.

Also, the cross-correlation value for the magnitude information of the signals of the same object sensed by each radar device is larger than the cross-correlation value for the magnitude information of the signals of different objects.

Therefore, at the step (d), the cross-correlation values for all the signal groups in the same signal group combination generated at the step (c) are calculated, and the calculated cross-correlation values are added. This is the same as the calculation process of the calculation unit 160 in which the detailed process of calculating the sum of cross-correlation values is described.

At the step (e) of selecting the signal group combination (S450), the sums of the cross-correlation values of respective signal group combinations calculated at step (d) are compared to select the signal group combination having the largest sum of the cross-correlation values.

At the step (f) of computing the position (S460), the signal groups of the selected signal group combination at the step (e) are matched to the objects and the distance information of the signals of the matched signal groups is used to compute the position of each object. The distance information of each signal is computed at the step (b). The process of computing the position of the object is the same as the calculation process of the position computation unit 180 described above.

Although the invention is described with reference to specific items such as specific elements, to merely some embodiments, and to drawings, such specific details disclosed herein are merely representative for purposes of helping more comprehensive understanding of the present invention. The present invention, however, is not limited to only the exemplary embodiments set forth herein, and those skilled in the art will appreciate that the present invention can be embodied in many alternate forms. Therefore, the spirit of the present invention shall not be limited to the above-described embodiments, and the entire scope of the appended claims and their equivalents will fall within the scope and spirit of the invention.

The invention claimed is:

1. A moving object detection method comprising:
   (a) receiving signals of multiple objects by using two or more radar devices;
   (b) computing distance information from the received signals;
   (c) randomly selecting one signal for each radar device among the received signal to generate multiple signal groups, and generating the signal groups selected among the generated multiple signal groups as one signal group combination, thereby generating multiple signal group combinations;
   (d) calculating cross-correlation values for all the signal groups in the same signal group combination and adding up the calculated cross-correlation values;
   (e) selecting the signal group combination in which a sum of the cross-correlation values is a maximum; and
   (f) computing a position of each object by matching the signal groups in the selected signal group combination to the objects,
   wherein at the step (c), the multiple signal groups and the multiple signal group combinations are generated in such a manner that all the signals belong to any one of the multiple signal groups belonging to the one signal group combination.

2. The moving object detection method of claim 1, wherein at the step (d), the cross-correlation values are calculated collecting magnitude and distance information of signals belonging to one signal group combination, for each frame within a predetermined time.

3. The moving object detection method of claim 2, wherein at the step (b), the distance information of signals belonging to one signal group is computed using a time taken for the signals radiated from the two or more radar devices to reflect off each object and to be sensed by the two or more radar devices.

4. The moving object detection method of claim 3, wherein at step (d), the position of each object is computed using distance information of signals in the signal groups in the selected signal group combination matched to the objects.

5. The moving object detection method of claim 1, wherein the two or more radar devices has directivity.

6. The moving object detection method of claim 1, wherein the two or more radar devices is an IR-UWB radar.

\* \* \* \* \*